Nov. 17, 1936.  M. ZELLER  2,061,182
METHOD FOR THE PRODUCTION OF A PHOTOGRAPHIC
EXPOSURE MATERIAL FOR COLOR SCREEN PICTURES
Filed March 31, 1934   2 Sheets-Sheet 1
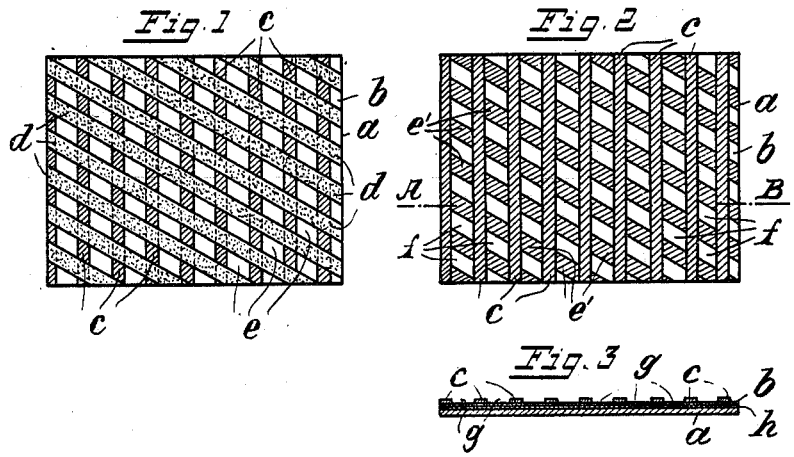
Martin Zeller
INVENTOR

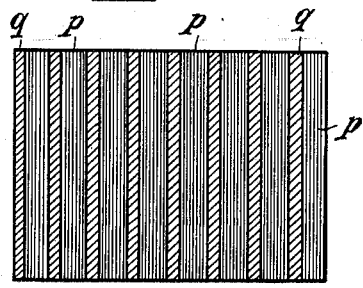
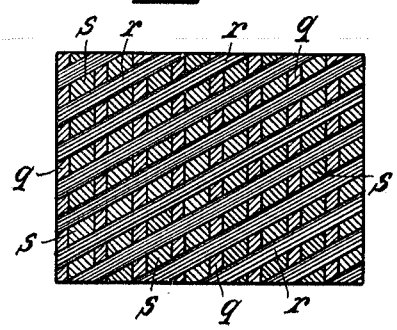
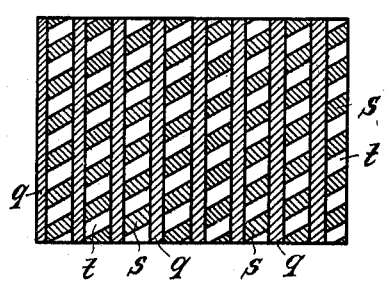
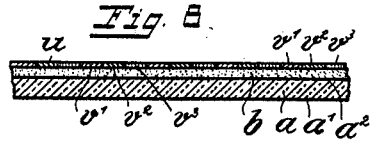
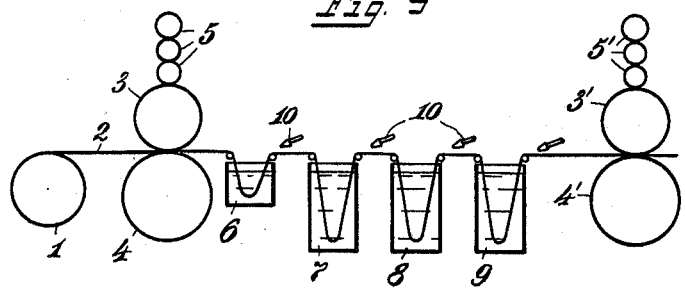

Patented Nov. 17, 1936

2,061,182

UNITED STATES PATENT OFFICE 2,061,182

METHOD FOR THE PRODUCTION OF A PHOTOGRAPHIC EXPOSURE MATERIAL FOR COLOR SCREEN PICTURES

Martin Zeller, Munich, Germany, assignor to Robert Röchling, Munich, Germany

Application March 31, 1934, Serial No. 718,405
In Germany April 21, 1933

13 Claims. (Cl. 95—2)

The present invention relates to photographic exposure material for color screen pictures, reflection pictures, and transparent pictures, and to a method of producing such material.

The color screen methods heretofore employed did not, by simple procedure which is the subject matter of my United States Letters Patent #2,009,424, issued July 30, 1935, produce results which could be deemed satisfactory.

It was heretofore attempted to distribute colored, sensitized emulsion pellets or granules in the three basic colors on an adhesive support, but this method was not successful. It is a recognized fact that in the use of colored granules the filtering of the rays only occurs at a certain depth, so that the surfaces of the several emulsion granules, irrespective of their color, are exposed to blue light, thus making it impossible to obtain a perfect color reproduction. In addition to this, the use of colored emulsions necessitates prolongation of the time of exposure.

It was also proposed to apply to an adhesive support color grains which were not sensitive to light but which contained a sensitizer and to apply thereover a color-blind emulsion; in the wet application of the latter the colored grains are supposed to impart the sensitizer to the superimposed emulsion. In this procedure it is necessary, however, that the color grains be applied with intervening spaces which are filled with a protective or covering mass (a black medium) to prevent diffusion of the sensitizer. It is impossible to apply color grains spaced at slight intervals to a support by dusting or spraying, and on the other hand, the necessary interstices result in such a large loss of color that this procedure is not suitable in practice. Moreover, reflection pictures, i. e., those which are viewed by reflected light, cannot be produced in this manner with any expectation of obtaining satisfactory results.

Another method which was proposed is the following: Color screen elements were printed in fatty colors on a homogeneous light sensitive color-blind layer. These fatty colors served at the same time as a resist to protect the adjacent fields in the subsequent sensitization and coloring. In this procedure it is necessary to make a number of color screen impressions which must be arranged in exact juxtaposition.

The present invention obviates the disadvantages of the foregoing procedure as well as the disadvantages of all other known procedures. By means of the procedure according to my present invention it is neither necessary to print in exact register nor need the support be invariable. A special advantage of the invention resides in the possibility of obtaining an exposure material in which the several elements, of the color screen, without gaps between the elements, lie in a single plane, whether it be in the light sensitive layer itself or in a liquid permeable superimposed layer or coating over the light sensitive layer.

The term "photographic exposure material" as used in the following specification and in the appended claims is intended to include bromide layers or silver chloride layers or other usual layers, as for example silver bromide collodion, etc. which are carried by a transparent or opaque carrier such as films or paper.

Certain steps of the method hereinafter described are broadly old, as for example the tanning and hardening, the coating of the screen elements with a protective element, the use of resist or supplemental screen for the purpose of screen formation, the local sensitization therebetween, the damping of the blue sensitivity by interposition of a yellow filter color, the coloring of the screen elements by development or vat dyes. These steps are not claimed broadly but are claimed in combination with the use of a color-blind homogeneous light sensitive layer, which is locally sensitized in the range of the elements of the gapless color screen for the colors of these elements, the screen elements or a part thereof being subjected each time before sensitization of the light sensitive layer for the next color to an additional or supplemental treatment which protects these elements against the action of the sensitizers and colors for the other elements which are to be later applied or introduced.

The invention may be used to apply the color screen directly to the light sensitive layer or to a fluid permeable layer which is superimposed on the light sensitive layer, this superimposed layer being locally sensitive to the colors of the elements.

Stated briefly, the invention resides in subjecting the screen elements or a part thereof to treatment, such as hardening or tanning, each time before partial sensitization of the emulsion and the coloring of the screen elements for the next color, the treatment being such that in the further progress of the method the elements may serve as resists. For example, the procedure may be such, that the first color (say blue) is applied by a fatty color mixed with a drying substance, then after leaving the space for the surface elements for the second color applying over the first color an auxiliary screen, for example a fatty screen, thereupon sensitizing for the second color, applying the same and hardening, then removing the auxiliary screen, and sensitizing the remaining spaces for a third color and coloring.

Another procedure which may be followed in producing the exposure material is to introduce and harden the colors, with the exception of the last color, through the sensitized gaps of an auxiliary screen, which must be displaced each time in accordance with the distribution of the screen, while the sensitization for the last color and the coloring thereof is effected between the hardened elements of previously applied color screens, after final removal of the auxiliary screen.

The increase in sensitivity for "blue" at the places sensitized for other colors (for example red and green), caused by the sensitizing process, can be eliminated by imparting yellow color to the top coating over the places in the light sensitive layer sensitized for red and green insofar as the screen lies over the light sensitive layer.

The blue elements of the screen, or some of them, may be produced in two stages, one component of the blue color being applied when preparing the sheet for exposure, and another being added after the exposure.

Examples of various modes of procedure in accordance with the invention are illustrated in the annexed drawings.

In the drawings, Figs. 1, 2, and 3 schematically represent two successive steps in one embodiment of the novel method, Fig. 3 being a cross-section along line A—B of Fig. 2. Fig. 4 is a cross section of a second exemplification. Figs. 5 to 7 represent two successive steps in one embodiment cation of my method. Fig. 8 is a sectional view of additional modification of the invention. Fig. 9 schematically illustrates a continuous process for producing photographic exposure material in accordance with my invention.

According to Fig. 1, a support $a$ is coated in the usual manner with a light sensitive layer $b$, the latter not being sensitized. Upon this light sensitive layer, which of itself is sensitive to blue, the blue screen elements $c$ are first applied, so that they cover one third of the entire surface. The blue screen elements consist of fatty colors to which is added, for example, a drying substance, by which the color dries very rapidly and is made insoluble against normal fat solvents. After complete drying of the blue color a fatty screen (auxiliary screen) $d$ is superimposed thereon which serves as a resist and covers one half of the total surface so that the interstices $e$ which remain between the screen elements $c$ and $d$ comprise one third of the total surface. The fatty screen $d$ may be placed (transversely or diagonally) without registration over the first screen; thereupon the emulsion in the interstices $e$ is sensitized for red for example, then is colored red and hardened with a usual hardening medium, such as formalin. For the red color it is desirable to use a color solution which is repelled by the fatty screens $c$ and $d$.

If, now, the resists $d$ be removed by means of a solution, for example carbon tetrachloride, then interstices or gaps $f$ (Fig. 2) result which are limited at one side by the screen elements $c$ and at the other side by the red colored and hardened elements $e'$. Upon dissolving away the auxiliary screen $d$ to which no drying substance had been added, the blue screen elements $c$ are not adversely affected because the latter are resinified in consequence of the added drying substance.

It is now only necessary to sensitize the gaps $f$ for a third color, for example green, and thereupon to color them (yellow or green as may be required). In the course of the last sensitization, that is in the green sensitization, no sensitization under the blue and red elements can occur because the blue screen elements $c$ repel the sensitizer in consequence of their fat content and the hardened red elements $e'$ retard the absorption of the sensitizer in consequence of their having been hardened. The special treatment, that is hardening and tanning of the layer, need not necessarily make the layer as such absolutely impermeable; it suffices if the layer remains resistant until the next element is sensitized and colored without the previously treated tanned or hardened element being again affected.

In sensitizing a color-blind emulsion (that is an ordinary emulsion which is sensitive only to blue) it is found that the sensitivity for blue is frequently enhanced by the sensitizing process. Dependent upon the sensitivity of the particular emulsion it may occur that the increased sensitivity to blue may cause disturbances, for example under the green or yellow elements. This can be avoided if after the application of the blue element the then remaining surface is additionally colored with yellow color; the same may be removable or unremovable dependent upon whether its retention or removal is desired for reasons of color graduation. This is shown in Fig. 3 which represents a section on the line A—B of Fig. 2. The applied blue screen elements are denoted $c$. The remaining surface $g$ between them is additionally colored with removable or unremovable yellow color. The application of the two additional color elements is effected in the manner described above.

In order to make the local sensitization as accurate as possible the use of an emulsion as thin as possible is recommended. But the thinner the emulsion is poured the more difficult is the photographic bath process after the exposure. The baths must penetrate between the remaining fatty screen elements $c$ through the other colored screen elements to the side under the fatty elements and there effect the conversion. It is extremely desirable that the action of the photographic baths proceed as uniformly and simultaneously as possible in the entire surface of the light sensitive layer. The thicker the layers the more easily is this condition fulfilled. In order to harmonize these two contradictory conditions I provide between the carrier $a$ and the light sensitive layer $b$, which is as thin as possible, a liquid permeable intermediate layer $h$, for example of gelatine, which promotes the lateral diffusion of the developing baths.

Here, also, the excess of sensitivity to blue at the places sensitized for red and green can be made harmless by applying the color screen elements not directly to the emulsion but to a yellow top coating over the emulsion. This is illustrated in Fig. 4, the support is denoted $a$, the emulsion $b$, the intermediate layer $h$, and the yellow colored top layer which contains the color screen elements is denoted $o$.

Figures 5–7 disclose a further modification of the process which is particularly advantageous in that the final product contains no fatty elements whatsoever and the several color screen elements lie in one plane. According to Fig. 5, there is first applied to the usual color-blind light sensitive layer an auxiliary screen $p$ which leaves free the (surface) elements $q$ for a color. In the form shown in these figures a three color screen is contemplated. As illustrated the auxiliary screen $p$ covers two thirds of the total surface and the gaps $q$ one third. Through the gaps $q$ sensitization for the first color, for example red, is effected and thereupon coloring and hardening are effected. Then the auxiliary screen $p$ is removed and replaced by a new auxiliary screen $r$ which covers half of the total surface, so that gaps $s$ aggregating one third of the total surface (Fig. 6) remain between the hardened red screen elements $q$ and the auxiliary screen elements $r$. Sensitization is effected through the gaps $s$ for the second color, for example green, and then the same is colored and hardened. Instead of coloring for green, coloring might be effected for yellow or for an intermediate shade.

After removal of the auxiliary screen $r$ gaps $t$ result (Fig. 7), which in turn aggregate a third of the total surface and are bounded by the hardened color screen elements $q$ and $s$. It therefore only remains necessary to introduce the third color, namely blue, through the gaps $t$. Sensitization is not necessary because the ordinary emulsion is of itself sensitive to blue.

Coloring of the blue color can take place at any desired stage; the sequence as well as the number of colors may also be different.

In lieu of a treatment which is equivalent to hardening or tanning, an element for the subsequent treatment might be protected by shellac or a similar coating. The procedure is then as follows:

After application of the fatty resist and after sensitization and coloring, as indicated for example in Fig. 1, then in lieu of hardening the color elements there is applied over the whole surface a very thin layer of shellac which cannot be wiped away at the gaps in the succeeding removal of the resist, for example by benzine, because in the gaps the shellac adheres to the blank gelatine layer, while at the places where it lies on the resist it is dissolved away when the fatty resist (auxiliary screen) is dissolved. After removal of the resist one third of the surface is then colored and covered with a protective element. Upon the application or introduction of the second screen element and its sensitization according to Figures 1–3, the procedure is the same as before. The sensitization, if desired, for the third color is then effected and thereupon the third color is applied or introduced between the remaining gaps which are bounded by the elements provided with the protective coating. But if desired, in addition to the shellac the underlying gaps (the element lying thereunder) may also be hardened or tanned. In lieu of the protective shellac coating, coatings of other materials such as casein or Pará rubber may be used. If the protective element consists of substances which are not affected by the succeeding processes, the protective coating may serve, when provided with color, as a color screen element. So far as the method of the present invention is concerned, it is immaterial whether the sensitization of the light sensitive layer occurs before or after the coloring of the screen elements. Likewise, the application of the hardening or tanning materials may be effected simultaneously with the sensitization or coloring or with both processes.

After the partial sensitization and upon completion of the color screen, the protective coating, for example shellac, is removed by a solvent, say alcohol, so that the whole surface is penetrable for the photographic baths.

The colors used are preferably development and vat dyes, leuco-esters or substantive dyes with subsequent treatment. As an example of a development color for red the first component would be beta-naphtol ($C_{10}H_7OH$) coupled with diazotized para-nitro-aniline (nitrazol) index $C(c)$. An example of a vat dye for yellow is: Algol yellow vat ($C_{32}H_{20}N_2O_6$). An example of a leuco-ester for blue is the sodium salt of sulfuric acid ester of leuco-alizarin indigo G ($C_{16}H_{10}N_2O_8S_2Na_2$); the color is produced both by sodium nitrite and sulfuric acid. An example of a substantive color with subsequent treatment para-green B(By) coupled with nitrazol.

Experiments have shown that in the use of a locally sensitized layer the filter colors may be much lighter than with the use of a panchromatic layer. The use of a yellow element in the exposure in place of a green element is not possible with panchromatic material because red penetrates through a yellow element, which would result in color falsification. If, however, according to the material of the present invention sensitization for only green or yellow is effected under yellow, red cannot respond. It is, however, possible to use a yellow element for exposure, but not for the copying process or for obtaining a transparent picture, because copying with a yellow element in the negative is not possible, because of the penetration of the red light and green is necessary for transparency.

To retain the advantage of the short exposure period which is obtained owing to the use of the yellow element, and still to retain a green screen element for copying and for projecting, I proceed as follows:

After the yellow screen element has been completely colored, a small quantity of the first component of a green or blue color is bathed and dried. The second component can then be added after the exposure without danger to the other screen elements, so that in fact at the time of exposure a yellow screen element and for copying or projecting a green screen element are present.

Fig. 8 shows a modified form of the inventive exposure material in which the color elements are arranged in a super-coating over the light sensitive layer. $a$ is the support, $b$ the light sensitive layer, $u$ the super-coating containing the color elements.

The expression fatty color in the description includes printable media which in general repel aqueous solutions. The several figures disclose merely examples.

In the drawings the screen elements consist of lines or parts of lines, but naturally the screen elements may be of any desired form, for example dots or grain screens.

The several procedures described above may be employed by way of rotation as a continuous process. To this end the paper or film to be treated is passed from the roll under a pressure cylinder which effects the application of the resists. The application of the fat to the pressure cylinder is effected by means of color mechanism such as used in book printing for high speed presses. After the material to be treated has passed the pressure cylinder, it may be passed over suitably driven guide rolls to the sensitizing bath, the drying installation or the blast installation, after the coloring bath and as a continuation of the hardening bath or the bath which applies the protective coating. Thereafter the fatty auxiliary screen is removed and the layer is exposed or made free for further treatment. Finally, after the material has passed a drying apparatus, it may be either immediately rolled up or fed to an additional similar installation for the succeeding treatment. It is apparent from the description, that for the last color the material need only be drawn through dye vats.

Fig. 9 illustrates the method schematically for continuous production of the material. 1 is a storage roll from which the support 2 provided with the light sensitive layer and top layer is drawn. The light sensitive material passes between the pressure roller 3 and a counter-pressure roller 4. As shown, for example in Fig. 5, the roller 3 applies the resist to the layer or to the top coating; the coating receives the fatty substance in the usual manner from a color apparatus 5. The light sensitive material 2 then passes through the sensitizing bath 6, then through the dye stuff bath 7, then through the hardening bath 8, and finally through a bath, for example benzine bath, in which the resist p is removed. After each bath a drying device, for example a blast 10 is provided. After leaving the last bath the layer or top layer is provided with the first hardened color element q and is previously locally sensitized thereunder for such color. The further treatment is effected in an analogous manner, in that the material 2 is drawn through a second pressure layout 3', 4', 5', which as shown in Fig. 6 applies the resist r, as well as through suitable baths (not shown) for the second color. For the application of the third color it is then only necessary to draw the material through a suitable dye bath and to dry it.

In the claims where reference is made to an additional treatment of the color screen elements or gaps, it is understood that I mean a tanning or hardening or coating of the elements with a protective coating or a tanning or hardening in combination with a coating of the elements with a protective layer, for the purpose of making the elements so treated unsensitive or impenetrable for the succeeding coloring or sensitizing processes, as well as to prevent diffusion.

The term additional treatment is also understood to include chemically acting resists, for example treating the elements with stannous salt ($SnCl_2$) or aluminium sulfate ($Al_2(SO_4)_3$), in order that the coupling (union) of the components of the development colors and consequently the coloring be prevented, for example in coloring with beta-naphthol plus nitrazol.

Obviously, the process of the invention is not limited to the colors blue, red, green, or yellow as screen colors, particularly certain mixed colors, for example orange, blue-green, violet, may be used, under which the emulsion would then be suitably sensitized.

In the accompanying claims the starting point is a usual coherent light sensitive layer, the essential characteristic of which is that it is unsensitized, that is it may not be sensitized for green, yellow and red. This requirement is fulfilled if light sensitive layers are superimposed, of which one is more light sensitive than the other, as long as enhancement to light sensibility is not attained by sensitization.

The terms "to apply" and "applying" as used in the appended claims is understood to include the placing of the colors into or on the light sensitive layer or into or on the top coating which is arranged over the light sensitive layer.

What I claim is:

1. The method of producing a color screen of a predetermined number of colors upon a support provided with a light-sensitive surface, for color-photography, which process comprises the following steps: setting aside sections of the light-sensitive surface for the first color and applying a resist to the remaining area of the said surface, sensitizing said sections for the first color and applying the first color to the said sections, subjecting the latter to a protective treatment, prior to the removal of the resist, to render the said sensitized and colored sections insensitive to the substances to be subsequently applied in the method, removing the resist, thereafter setting aside sections for the second color, and applying a resist in the sections intended for subsequent colors, sensitizing said sections intended for the second color and coloring the same with the second color, and continuing the foregoing method until all colors are applied.

2. The method claimed in claim 1, in which the said surface is sensitive to one color, and the said sensitizing steps are carried out for every color applied except that to which said surface is sensitive.

3. The method of producing a color screen of a predetermined number of colors upon a support for color-photography, which process comprises the following steps: providing a continuous light sensitive layer upon the said support, applying a light and liquid permeable coating upon the said layer, setting aside sections of said coating for the first color and applying a resist to the remaining area of the coating, sensitizing the said sections of the coating for the first color and applying the first color, subjecting said sensitized and colored sections to a protective treatment to render the same permanently insensitive to the substances to be subsequently applied in the method, removing the resist, thereafter setting aside sections of the coating intended for the second color and applying a resist in the sections intended for subsequent colors, sensitizing said sections intended for the second color and coloring the same with the second color, and continuing the method until all colors have been applied.

4. The method claimed in claim 3, in which the said layer provided on the support is sensitive to one color and the said sensitizing steps are carried out for all predetermined colors except that to which the said layer is sensitive.

5. The method claimed in claim 3 in which said protective treatment comprises tanning and hardening in order to protect the sensitized and colored section of one color from the substances, sensitizers and colors subsequently applied.

6. The method claimed in claim 1, in which said protective treatment consists in covering the respective sensitized and colored sections with a coating prior to the removal of the said resist, in order to protect the sensitized and colored sections of one color from the substances, sensitizers and colors subsequently applied, said protective coating transforming the sections treated into resists for the duration of the method.

7. The method of producing a color screen of a predetermined number of colors upon a light-sensitive support, for color-photography, which process comprises the following steps: providing the said support with a light and liquid permeable coating, passing said coated support between printing rollers and continuously applying a resist to the coated support except in the sections intended for the first color, thence passing the support and the resists provided thereon through a sensitizing bath and then a coloring bath to apply the first color, thence the support is passed through a hardening bath to harden and protect the sensitized and colored sections from substances to be subsequently applied, thereafter passing the support through a bath removing the said resist; thereafter passing the support thus treated between a second set of printing rollers and continuously applying a resist in the sections intended for subsequent colors except the second color, passing the support through sensitizing and coloring baths as hereinbefore described to apply the second color and continuing this method until all colors are applied, the said support being dried after each bath.

8. The method claimed in claim 1, in which prior to the application of each new color, the sections provided with the preceding color are subjected to a protective treatment to render said sections insensitive to the substances of such new color, no protective treatment being required for the last color applied to the said support.

9. The method of producing a two-color screen upon a light-sensitive support for color-photography, which method comprises the following steps: covering said support with a light and liquid permeable layer, setting aside sections of the layer intended for the first color and applying a resist upon the said layer which resist covers the sections intended for the second color, sensitizing the said sections for the first color and applying the first color thereto, thereafter subjecting the sensitized and colored sections to a protective treatment to render the same insensitive to the substances applied in connection with the second color, thereafter removing the said resist and employing the said protected sections as resist, sensitizing the uncovered sections of the layer for the second color and applying the second color.

10. The method claimed in claim 9, in which the said protective treatment consists in submerging the support in a bath containing the protective agent, the latter being subsequently removed with the resist in the sections intended for the second color.

11. The method claimed in claim 1, in which said protective treatment consists in passing the support through a bath containing the protective agent, the latter being removed together with the resist in the sections intended for subsequent colors, while the protected sensitized and colored sections are not affected and act as resists during the following method.

12. The method of producing a three-color screen upon a support sensitive to a single color, for color-photography, which method comprises the following steps: covering the said support with a light and liquid permeable layer, applying a resist upon said layer covering two-thirds of the area thereof, sensitizing the uncovered third of said layer for the first color and applying the first color; thereafter tanning and hardening the sensitized and colored portion of the said layer, removing the resist and utilizing the said hardened sections as resists; applying a supplemental resist sparing but one third of the said layer, sensitizing the last-mentioned third of said layer for the second color and applying the second color; thereafter tanning and hardening the sections provided with the second color and removing the supplemental resist; thereafter sensitizing the remaining one-third of said layer for the third color and applying the third color, whereby the hardened sections of the first and second color act as resists during the method.

13. The method claimed in claim 12, in which the said first and second resist consists of a plurality of stripes, the first resist covering two-thirds of the area of the said layer and the stripes of said second resist being disposed at an angle to the stripes of the first resist and covering one-half of the total area of said layer, whereby the space left clear for the third color, after removal of the resists and application of the first and second color, amounts to one-third of the total area of the layer.

MARTIN ZELLER.

CERTIFICATE OF CORRECTION.

Patent No. 2,061,182.                                                       November 17, 1936.

Martin Zeller.

It is hereby certified that error appears in the above numbered patent requiring correction as follows: In the drawings, Sheet 1, Figure 4 as shown below should be inserted as part of the Letters Patent:

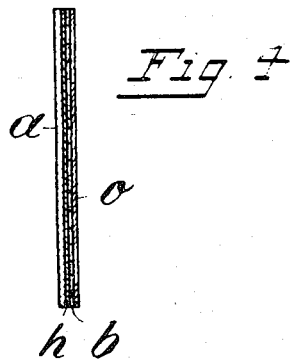

and that the said Letters Patent should be read with this correction therein that the same may conform to the record of the case in the Patent Office.

Signed and sealed this 6th day of April, A.D. 1937.

Henry Van Arsdale (Seal)                                       Acting Commissioner of Patents.